UNITED STATES PATENT OFFICE.

THOMAS CROSSLEY, OF BRIDGEPORT, CONNECTICUT.

IMPROVEMENT IN PRINTING AND DYEING FABRICS.

Specification forming part of Letters Patent No. 139,705, dated June 10, 1873; application filed February 4, 1873.

*To all whom it may concern:*

Be it known that I, THOMAS CROSSLEY, of Bridgeport, in the county of Fairfield and State of Connecticut, have invented an Improvement in the Art of Preparing and Compounding the Base and Colors used in Printing Woven and Felted Fabrics, of which the following is a specification:

My invention consists in making the base with which the colors are combined of a friable material, which, after the colors are set by steaming, can be removed without washing, at the same time effecting an economy in amount of coloring material employed.

Heretofore, in preparing the colors for printing fabrics, the colors in solution have been mixed with a base composed in equal proportions, or nearly equal proportions, of a gummy substance and pipe-clay, or equivalent materials, the whole compound being afterward boiled. The result was that only about one-half of the coloring-matter was taken up by the fabric, if the latter was of heavy goods, such as carpets, and the hard compound of gum and clay had to be removed by washing.

In working my improved process, I prepare a solution of the gum and boil it alone, making a solution of the pipe-clay in cold water, and when required for use I mix about twenty per cent. of the solution of gum with eighty per cent. of the solution of pipe-clay, and add the solution of colors to make the required shade or tint, and apply the mixture to the blocks in the usual manner.

When the operation of printing is completed, which should be done as quickly as possible, and the colors come to be set by steaming, a much larger proportion of the color will be absorbed by the capillaries of the fabric, as the pipe-clay will more readily part with the coloring matters than when boiled with the gum, as in the usual mode, and the base being more friable, it can be removed from the surface by rubbing, beating, or brushing, or a combination of these operations, without washing.

What I claim as my invention, and desire to secure by Letters Patent, is—

The process for preparing and compounding the base and colors used in printing woven and felted fabrics by mixing a cold solution of pipe-clay with solutions of gum and colors without boiling the compound before using, substantially as set forth.

In testimony whereof I have signed my name to this specification in the presence of two subscribing witnesses.

THOMAS CROSSLEY.

Witnesses:
 DAVID B. LOCKWOOD,
 JAMES STAPLES.